(12) United States Patent
Shimizu et al.

(10) Patent No.: US 10,978,253 B2
(45) Date of Patent: Apr. 13, 2021

(54) CAPACITOR DEVICE

(71) Applicant: NIPPON CHEMI-CON CORPORATION, Tokyo (JP)

(72) Inventors: Makoto Shimizu, Tokyo (JP); Kenichi Onda, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 49 days.

(21) Appl. No.: 16/485,322

(22) PCT Filed: Mar. 12, 2018

(86) PCT No.: PCT/JP2018/009413
§ 371 (c)(1),
(2) Date: Aug. 12, 2019

(87) PCT Pub. No.: WO2018/168737
PCT Pub. Date: Sep. 20, 2018

(65) Prior Publication Data
US 2019/0362900 A1    Nov. 28, 2019

(30) Foreign Application Priority Data
Mar. 14, 2017  (JP) .............................. JP2017-048249

(51) Int. Cl.
*H01G 9/00* (2006.01)
*H01G 4/38* (2006.01)
(Continued)

(52) U.S. Cl.
CPC .............. *H01G 9/0003* (2013.01); *H01G 9/07* (2013.01); *H01G 9/14* (2013.01); *H01G 9/151* (2013.01)

(58) Field of Classification Search
None
See application file for complete search history.

(56) References Cited

U.S. PATENT DOCUMENTS 5,057,967 A * 10/1991 Den ......................... H01G 4/38
361/328
5,475,272 A    12/1995 Gothelf
(Continued)

FOREIGN PATENT DOCUMENTS

GB    748716 A     5/1956
JP    S58-20530 U  2/1983
(Continued)

OTHER PUBLICATIONS

International Search Report dated Jun. 5, 2018, issued in counterpart International Application No. PCT/JP2018/009413, with English Translation. (4 pages).
(Continued)

*Primary Examiner* — Dion Ferguson
(74) *Attorney, Agent, or Firm* — Westerman, Hattori, Daniels & Adrian, LLP

(57) ABSTRACT

A capacitor circuit (capacitor device 20, 30, 34, 50) in which a plurality of capacitors (41 to 45) are connected to each other is included, one or two or more capacitors (overvoltage short-circuiting capacitors 40, 40a, 40b, 40c, 40d) in the capacitor circuit have a dielectric breakdown voltage made lower than that of another capacitor, and the one or two or more capacitors having the lower dielectric breakdown voltage are subjected to dielectric breakdown due to application of an overvoltage earlier than the other capacitor so that the capacitor circuit is short-circuited. As a result, the safety of the capacitor device and a device connected thereto can be enhanced.

16 Claims, 9 Drawing Sheets

(51) Int. Cl.
  *H01G 9/07* (2006.01)
  *H01G 9/14* (2006.01)
  *H01G 9/15* (2006.01)

(56) References Cited

U.S. PATENT DOCUMENTS

| | | | | |
|---|---|---|---|---|
| 7,126,810 | B1* | 10/2006 | Mueller | H02J 15/00 |
| | | | | 361/328 |
| 7,477,505 | B2* | 1/2009 | Timmerman | H01G 2/04 |
| | | | | 361/502 |
| 9,837,217 | B2* | 12/2017 | Oh | H01G 11/74 |
| 2010/0302708 | A1* | 12/2010 | Shiue | H01G 9/26 |
| | | | | 361/502 |
| 2013/0082520 | A1* | 4/2013 | Leemans | H01G 4/38 |
| | | | | 307/9.1 |
| 2018/0005768 | A1 | 1/2018 | Shimizu et al. | |

FOREIGN PATENT DOCUMENTS

| | | |
|---|---|---|
| JP | 2000-164467 A | 6/2000 |
| JP | 2002-345247 A | 11/2002 |
| JP | 2006-156546 A | 6/2006 |
| WO | 2016/157823 A1 | 10/2016 |

OTHER PUBLICATIONS

Written Opinion of the International Searching Authority (Form PCT/ISA/237) dated Jun. 5, 2018, issued in counterpart International Application No. PCT/JP2018/009413 (3 pages).
Notification of Transmittal of Translation of the International Preliminary Report on Patentability (Form PCT/IB/338) issued in counterpart International Application No. PCT/JP2018/009413 dated Sep. 26, 2019 with Forms PCT/IB/326, PCT/IB/373 and PCT/ISA/237. (11 pages).
Kang, Arimine, "Modern Electronic Process Practical Training Course", Series and Parallel Capacitors, Aug. 2014, pp. 75-76, with English Translation; Cited in CN Office Action dated Nov. 24, 2020. (7 pages).
Office Action dated Nov. 24, 2020, issued in counterpart CN application No. 201880016446.X, with Partial English translation. (15 pages).
European Extended (supplementary) Search Report dated Dec. 14, 2020, issued in counterpart EP Application No. 18767654.9 (5 pages).

* cited by examiner

FIG.9

| | CONFIGURATION OF CAPACITOR DEVICE | DISPOSITION CONDITION OF OVERVOLTAGE SHORT-CIRCUITING CAPACITOR | PRESENCE OR ABSENCE OF PROTECTIVE HOUSING | TEST RESULT |
|---|---|---|---|---|
| TEST EXAMPLE 1 | TWO-SERIES/TWO-PARALLEL | ONE FOR EACH PARALLEL CONNECTION | ABSENCE | ACCEPTABLE |
| COMPARATIVE EXAMPLE 1 | TWO-SERIES/TWO-PARALLEL | NON-USE | ABSENCE | NOT ACCEPTABLE |
| TEST EXAMPLE 2 | TWO-SERIES/SIX-PARALLEL | ONE FOR EACH PARALLEL CONNECTION | PRESENCE | ACCEPTABLE |
| TEST EXAMPLE 3 | TWO-SERIES/SIX-PARALLEL | TWO FOR EACH PARALLEL CONNECTION | PRESENCE | ACCEPTABLE |
| COMPARATIVE EXAMPLE 2 | TWO-SERIES/SIX-PARALLEL | TWO FOR EACH PARALLEL CONNECTION | ABSENCE | NOT ACCEPTABLE |
| COMPARATIVE EXAMPLE 3 | TWO-SERIES/SIX-PARALLEL | NON-USE | ABSENCE | NOT ACCEPTABLE |

US 10,978,253 B2

CAPACITOR DEVICE

TECHNICAL FIELD

The present invention relates to a safety management technique of a capacitor circuit against application of an overvoltage.

BACKGROUND ART

Electrolytic capacitors are widely used in power source apparatuses and power conversion apparatuses. For example, in an inverter, an electrolytic capacitor is used as an input smoothing capacitor. A ripple current generated by switching of a switching element is applied to the input smoothing capacitor. In the case of an AC power source, the electrolytic capacitor is required to have a function of smoothing not only this ripple current but also a ripple current generated by a rectification circuit on the input side.

For a smoothing capacitor unit, multiple electrolytic capacitors connected in series and parallel are used depending on a generated ripple current and input voltage, for example.

In some of power source apparatuses using such capacitors, the electrolytic capacitor is covered with a cap so as to receive electrolyte ejected due to operation of an explosion-proof valve when a voltage exceeding an allowable voltage is applied to a smoothing capacitor (e.g., Patent Document 1).

PRIOR ART DOCUMENT

Patent Document

Patent Document 1: Japanese Laid-Open Patent Publication No. 2006-156546

SUMMARY OF THE INVENTION

Problem to be Solved by the Invention

In a capacitor circuit in which multiple capacitors are connected in series, for example, when one capacitor is short-circuited (shorted), an excessive voltage is applied to another capacitor, a connected device, etc., which may cause a safety problem such as breakage of a device connected to the capacitor circuit. Therefore, it is necessary to satisfy a standard for safety of inverters, for example, the UL (Underwriters Laboratories) standard. According to the UL standard, in an apparatus made up of multiple capacitors including a series connection, one capacitor in the apparatus is intentionally shorted to apply an overvoltage to the other capacitor connected in series. In this case, it is necessary to prevent an inverter connected to the capacitor device from igniting. To comply with this UL standard, it is necessary to prevent the forcibly generated overvoltage from affecting the inverter side.

Additionally, if a capacitor in a capacitor device is broken due to generation of the overvoltage caused by the short circuit of the capacitor, the inverter must be prevented from being broken or igniting due to sparks, or scattering of contents, of the broken capacitor. However, a capacitor device including a large number of capacitors has a problem of difficulty in predicting which capacitor will be broken. Additionally, if protective means are applied to all the capacitors so as to enhance safety, the size of the capacitor device may become larger and the costs may be increased.

Such a problem is not disclosed or suggested in Patent Document 1 and cannot be solved by the disclosed configuration.

Therefore, in view of the problem described above, an object of the present invention is to improve security performance and safety of a capacitor device.

Means for Solving Problem

To achieve the object, an aspect of the present invention provides a capacitor device including: a capacitor circuit in which a plurality of capacitors are connected to each other, wherein one or two or more capacitors in the capacitor circuit have a dielectric breakdown voltage made lower than that of another capacitor, and wherein the one or two or more capacitors having the lower dielectric breakdown voltage are subjected to dielectric breakdown due to application of an overvoltage earlier than the other capacitor so that the capacitor circuit is short-circuited.

In the capacitor device, the one or two or more capacitors may each include an overvoltage short-circuiting function part.

In the capacitor device, capacitor groups each including a plurality of the capacitors connected in parallel may be formed in the capacitor circuit, and each of the capacitor groups may include at least one of the capacitors having the lower dielectric breakdown voltage.

In the capacitor device, the one or two or more capacitors may each include, in a portion of a separator interposed between electrode foils, a low insulating part having a low insulating function for the electrode foils.

In the capacitor device, the capacitor circuit may include a protective housing or protective housings at least around the one or two or more capacitors.

Effect of the Invention

According to the present invention, any of the following effects is obtained.

(1) A specific capacitor is broken by a short circuit due to an overvoltage applied into the circuit, so that the overvoltage can be prevented from being applied to a connected inverter etc.

(2) Since the capacitor to be shorted is specified in advance so that a countermeasure can be prepared against the breakage of the capacitor at the time of overvoltage application, the safety of the capacitor device and a device connected thereto can be enhanced.

(3) By disposing the protective housing only for the capacitor to be shorted, the scattering of contents and the ignition of the capacitor can be prevented to enhance the safety, and since no protective means such as a housing is formed for a capacitor less likely to be broken, cost reduction can be achieved.

Other objects, features, and advantages of the present invention will become more apparent by reference to the accompanying drawings and embodiments.

BRIEF DESCRIPTION OF DRAWINGS

FIG. 9 is a diagram shown a result of an experimental example.

MODES FOR CARRYING OUT THE INVENTION

[Embodiment]

Figure 1:
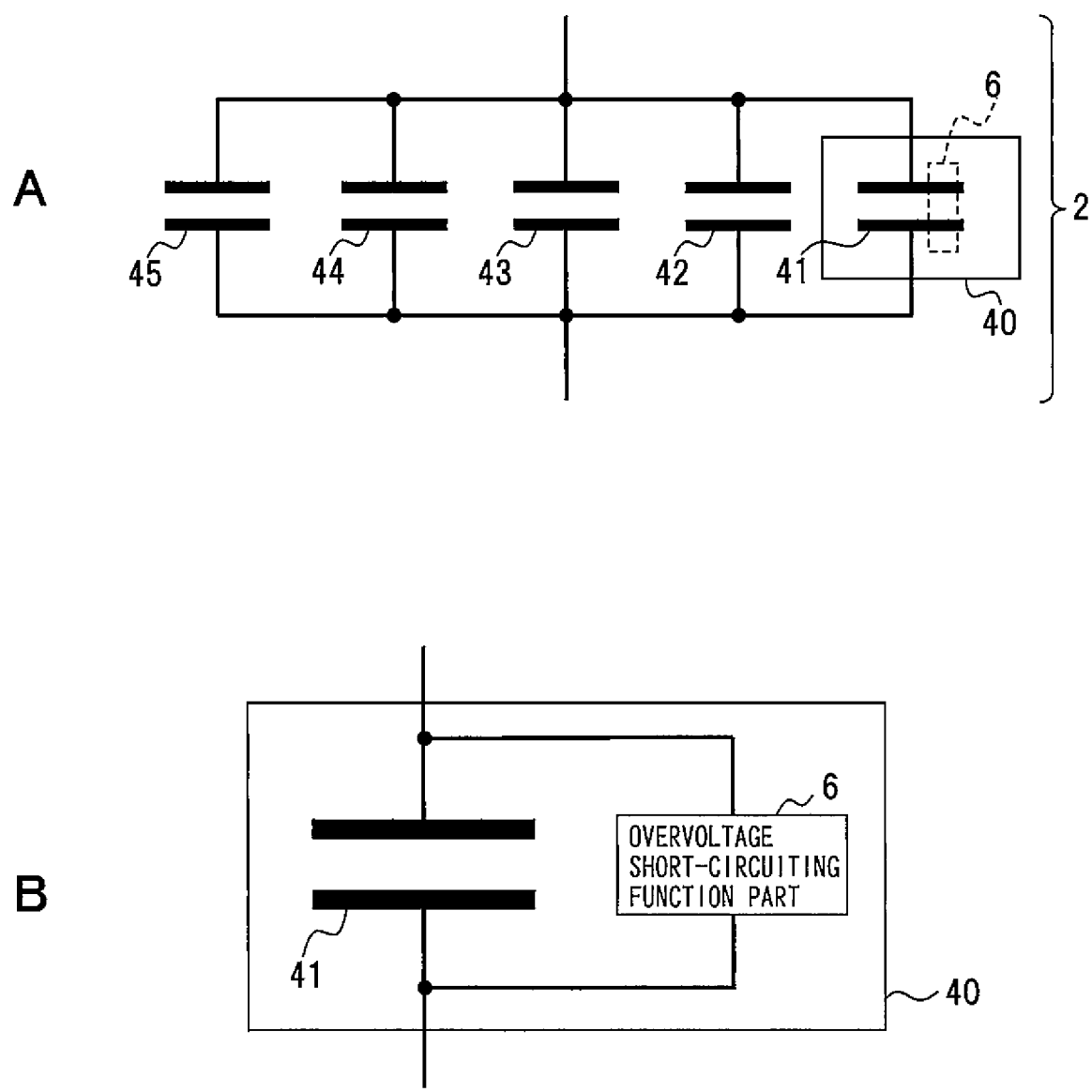
FIG. 1 is a diagram showing an exemplary configuration of a capacitor device according to an embodiment.

FIG. 1 shows a capacitor device according to an embodiment. The configuration shown in FIG. 1 is an example, and the present invention is not limited to the configuration.

This capacitor device 2 includes a capacitor circuit in which five capacitors 41, 42, . . . 45 are connected in parallel as shown in A of FIG. 1, for example. The capacitor device 2 is used for a power source apparatus, a power conversion apparatus, etc. and exhibits a function of smoothing input electric power with the parallel connection capacitor circuit.

In the multiple capacitors connected in parallel, the capacitor 41 is an example of an overvoltage short-circuiting capacitor 40, and shorts earlier than the other capacitors 42, 43, 44, 45 when an overvoltage is applied to the capacitor circuit. The overvoltage short-circuiting capacitor 40 has a dielectric breakdown voltage set lower than the dielectric breakdown voltage of the other capacitors 42, 43, 44, 45 and is an example of a capacitor of the present disclosure subjected to dielectric breakdown due to application of an overvoltage. The dielectric breakdown voltage is a voltage that causes a dielectric breakdown leading to a short circuit since the insulation cannot be maintained when the voltage, which is higher than withstand voltages of electrode foil, electrolyte, a separator, etc., is applied between a terminal component on the anode side and a terminal component on the cathode side of the capacitor. Therefore, the overvoltage short-circuiting capacitor 40 is configured to easily short due to application of a voltage higher than a rated voltage. When a voltage equal to or lower than the rated voltage is applied, the overvoltage short-circuiting capacitor 40 can store an electric charge as with the other capacitors 42, 43, . . . 45.

For example, as shown in B of FIG. 1, the overvoltage short-circuiting capacitor 40 has an overvoltage short-circuiting function part 6 connected to the capacitor 41. The overvoltage short-circuiting function part 6 is an example of a functional means shorting the capacitor 41 when the voltage applied to the capacitor 41 side is equal to or higher than a reference voltage. The overvoltage short-circuiting function part 6 only needs to have a function of determining an applied voltage and a function of short-circuiting the capacitor 41, may be made up of, for example, a voltage detection circuit and an electronic circuit short-circuiting the capacitor 41 depending on a detected voltage value, or may be made up of functional components implementing such functions.

The capacitor device 2 is formed of a capacitor circuit in which the capacitors 41, 42, . . . 45 are connected to a circuit board not shown, for example. On this circuit board, for example, the capacitor 41 serving as the overvoltage short-circuiting capacitor 40 may be disposed at a preset position. In this case, the circuit board may have a connection position displayed distinguishably between the normal capacitors 42, 43, . . . 45 and the capacitor 41 in a manner easily visible from the outside.

The arrangement position of the overvoltage short-circuiting capacitor 40 is not limited to a specific position on the circuit board and may be set for each of devices to be used. In the capacitor device 2, at least one of the multiple capacitors connected in parallel may serve as the overvoltage short-circuiting capacitor 40, or two or more overvoltage short-circuiting capacitors 40 may be disposed.

Figure 2:
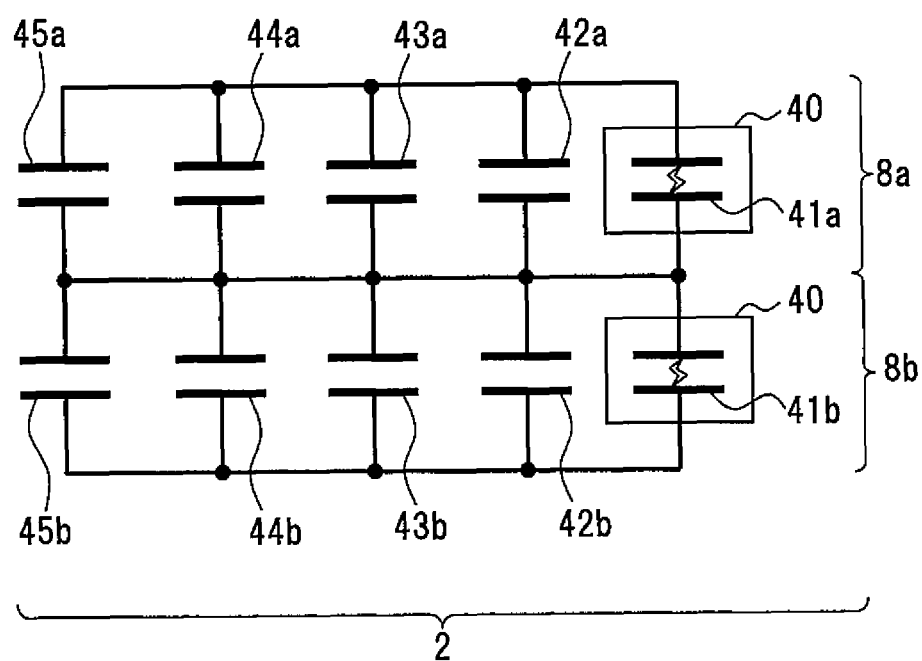
FIG. 2 is a diagram showing an exemplary configuration of a capacitor device in which capacitors are connected in series and parallel.

Description will be made of the case that capacitors are connected in series and parallel. FIG. 2 is a diagram showing an example of a capacitor device in which capacitors are connected in series and parallel.

For example, as shown in FIG. 2, the capacitor device 2 includes a two-series/five-parallel capacitor circuit including a capacitor group 8a including five capacitors 41a, 42a, 43a, 44a, 45a connected in parallel and a capacitor group 8b including capacitors 41b, 42b, 43b, 44b, 45b such that the capacitors are connected in parallel between the two capacitor groups 8a, 8b.

At least the capacitor 41a is the overvoltage short-circuiting capacitor 40 among the five capacitors 41a, 42a, 43a, 44a, 45a, for example, in the capacitor group 8a. Similarly, the capacitor 41b of the capacitor group 8b is the overvoltage short-circuiting capacitor 40. In the capacitor device 2, for example, the multiple capacitors are connected in series for voltage sharing during a normal time, and the multiple capacitors are connected in parallel to increase electrostatic capacity depending on an output of device such as an inverter to which the capacitor device 2 is connected. In the capacitor device 2, for example, when an overvoltage is applied, the capacitor 41a is promptly broken and shorted in the capacitor group 8a. The current flowing through the capacitor device 2 flows toward the capacitor group 8b through the capacitor 41a reduced in resistance value due to the short circuit. In the capacitor group 8b, the capacitor 41b is broken and shorted earlier than the other capacitors 42b to 45b due to the applied overvoltage. As a result, the current flowing through the capacitor group 8b more easily flows toward the capacitor 41b reduced in resistance value. By including the capacitors 41a, 41b more easily shorted due to application of the overvoltage in this way, the capacitors to be broken can be specified.

The capacitor device 2 represents the case that the capacitors 41b to 45b are connected in series to the capacitors 41a to 45a, respectively, while the capacitor groups 8a, 8b each include the at least one overvoltage short-circuiting capacitor 40. In contrast, if capacitors not connected in series are included between the capacitor group 8a and the capacitor group 8b, the overvoltage short-circuiting capacitor 40 may be connected in accordance with the connection relationship of the capacitors.

<Configuration of Capacitor>

Figure 3:
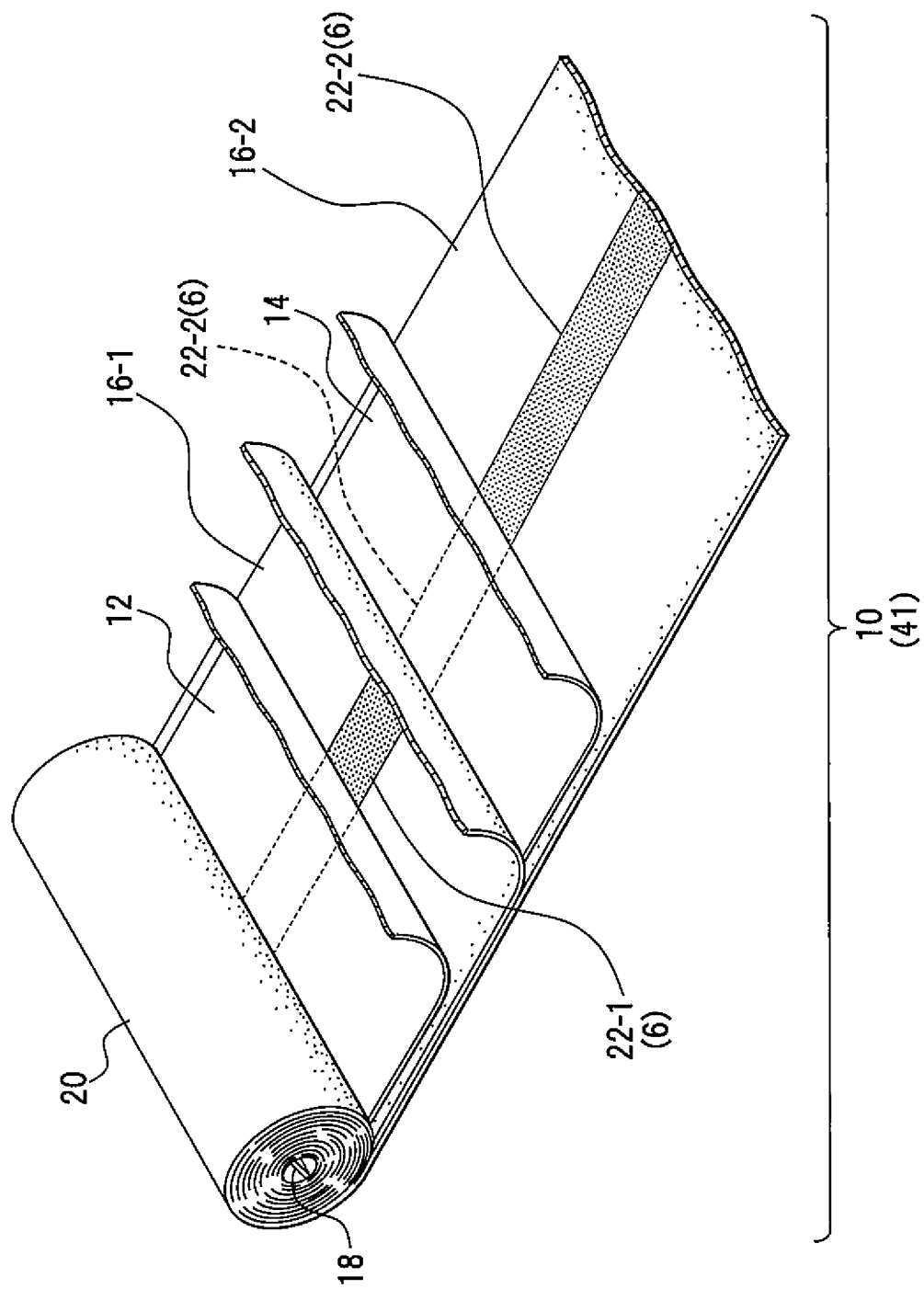
FIG. 3 is a diagram showing an exemplary configuration of a capacitor element.

An exemplary configuration of an easily shorted capacitor will be described. FIG. 3 is a diagram showing an exemplary configuration of a capacitor element. This capacitor element is an example, and the present invention is not limited to this configuration.

This capacitor element 10 is an example of a component of a capacitor including the overvoltage short-circuiting function part 6 of the present disclosure. The capacitor constituting the capacitor device 2 is, for example, an electrolytic capacitor, and includes a laminated body of an anode foil 12 and a cathode foil 14 serving as electrode foils and separators 16-1, 16-2 serving as insulating means of the electrode foils. The capacitor element 10 is a wound element 20 in which the laminated body is wound around a winding center 18. For the anode foil 12 and the cathode foil 14, for example, an aluminum foil is used. The anode foil 12 has a dielectric oxide film formed on the surface of the foil by a chemical conversion treatment after an etching treatment.

The separators 16-1, 16-2 are made of, for example, electrolytic paper such as kraft fiber nonwoven fabric or hemp fiber nonwoven fabric. The separator 16-1 insulates the anode foil 12 and the cathode foil 14 from each other when laminated. The separator 16-2 is disposed in a lowermost layer of the laminated body, for example, and insulates the anode foil 12 located inside when wound, from the cathode foil 14. The separators 16-1, 16-2 are formed in a strip shape wider than the anode foil 12 and the cathode foil 14 and maintains the insulation between the anode foil 12 and the cathode foil 14 even if the foils are displaced.

The separators 16-1, 16-2 have surface treatment parts 22-1, 22-2 having a predetermined width and a predetermined length along a winding direction in a range of a portion or the whole of respective foil surfaces. The surface treatment parts 22-1, 22-2 are an example of the overvoltage short-circuiting function part 6 of the present disclosure and are embossed by forming the foil surfaces of the separators 16-1, 16-2 into an uneven shape, for example. The insulating functions of the separators 16-1, 16-2 are reduced by the surface treatment parts 22-1, 22-2. Therefore, the surface treatment parts 22-1, 22-2 are vulnerable parts to the overvoltage in the capacitor element 10.

For example, the surface treatment parts 22-1, 22-2 are formed due to a difference in compression of a separator surface by pressing a roller having unevenness formed thereon against one surface of each of the separators 16-1, 16-2. Specifically, the surface treatment parts 22-1, 22-2 are regions in which a concave part formed on each of the separators 16-1, 16-2 are strongly compressed by a roller having a convex part, for example, and the thickness of the separator is reduced by this compression. Since the thickness of the concave part is smaller than the other parts, the insulating functions of the separators 16-1, 16-2 are reduced.

Figure 4:
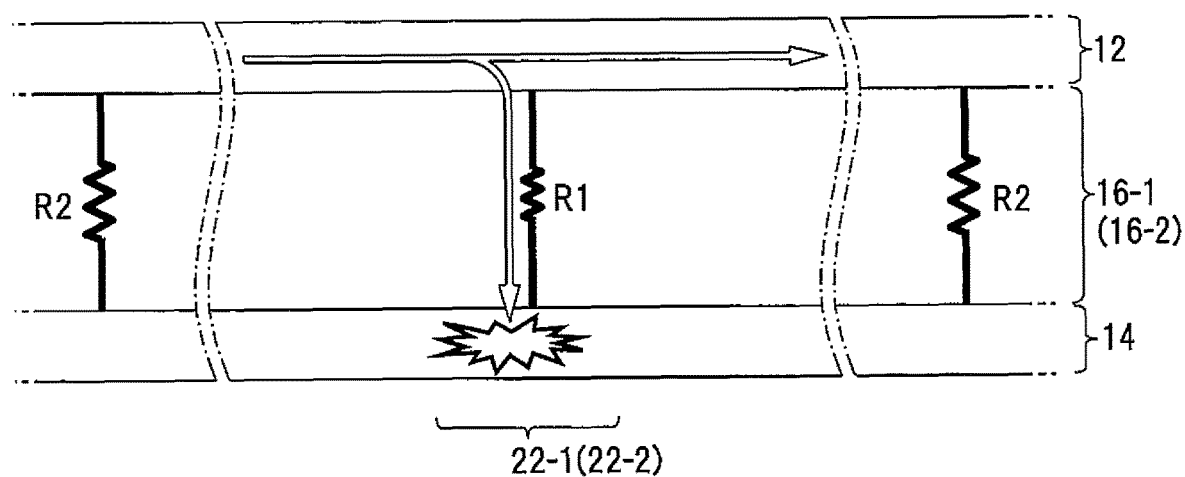
FIG. 4 is a diagram showing an exemplary functional configuration of a separator including a low insulation part.

For example, as shown in FIG. 4, when the insulation resistance of the surface treatment part 22-1 is R1 and the insulation resistance of the separator 16-1 of the portion not subjected to the surface treatment is R2, since a surface-treated portion generates variations in thickness of the separator 16-1, for example, and particularly, a thin portion is included, the insulation resistance R1 becomes smaller than the insulation resistance R2 of the separator 16-1. Therefore, when an overvoltage exceeding the rated voltage is applied to the capacitor, a short circuit occurs in the surface treatment part 22-1 having a small insulation resistance. Similarly, in the separator 16-2, a short circuit occurs in the surface treatment part 22-2 having a small insulation resistance. Since portions of the separators 16-1, 16-2 act as low insulating parts due to the formation of the surface treatment parts 22-1, 22-2, the short circuits can be induced.

The formation ranges of the surface treatment parts 22-1, 22-2 may be set based on a size, a value of the rated voltage, and a use environment of the capacitor, for example. Even though the surface treatment parts 22-1, 22-2 are formed, the capacitor element 10 has withstand voltage characteristics satisfying the withstand voltage performance required for the capacitor when the rated voltage is applied. Therefore, the capacitor element 10 functions as the normal capacitor 41.

Additionally, the capacitor element 10 includes terminal components not shown on the foil surfaces of the anode foil 12 and the cathode foil 14, for example.

[Effects of Embodiment]

According to this configuration, the following effects are obtained.

(1) In the capacitor device having multiple capacitors connected in parallel, the capacitor device partially includes an easily shorted capacitor or easily shorted capacitors. A capacitor to be broken by a short circuit in the case of generation of an overvoltage in a capacitor circuit can then be specified in advance. Since the capacitor to be shorted can be specified, a safety measure for the capacitor circuit can be taken in advance.

(2) In the capacitor circuit having multiple capacitors connected in series and parallel, the capacitor circuit includes respective easily shorted capacitors for capacitor groups each having some capacitors connected in parallel. The capacitor circuit can then satisfy the UL standard in which a portion of a circuit is intentionally shorted to determine the influence thereof.

(3) In the capacitor device having multiple capacitors connected in parallel, the capacitor device partially includes an easily shorted capacitor or easily shorted capacitors. An overvoltage can then be prevented from being applied to a device such as an inverter connected to the capacitor circuit.

(4) At least one capacitor having the overvoltage short-circuiting function part is provided for each capacitor group having multiple capacitors connected in parallel. Capacitors to cause short circuits can then be specified, and measures against these short circuits can be taken, so that safety can be enhanced.

(5) The surface treatment parts 22-1, 22-2 are formed by embossing on portions of the separators 16-1, 16-2 of the capacitor element to adjust the insulation performance. A short circuit can then be facilitated in response to application of the overvoltage. As a result, the overvoltage short-circuiting capacitor 40 can be formed.

Example 1

Figure 5:
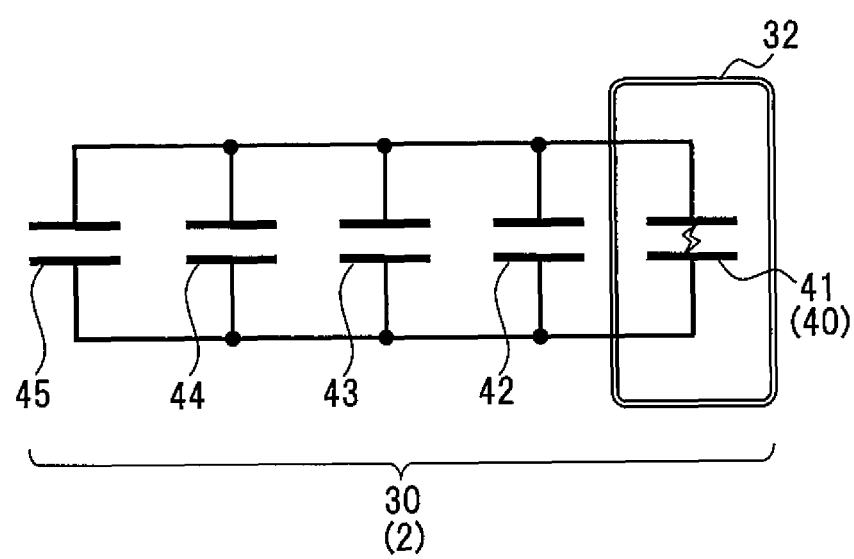
FIG. 5 is a diagram showing a first example of the capacitor device.

An example of the capacitor device will be described. FIG. 5 shows a first example of the capacitor device.

In a capacitor device 30, for example, the capacitor 41 is the overvoltage short-circuiting capacitor 40 among the capacitors 41 to 45 connected in parallel. The capacitor device 30 includes a protective housing 32 around the overvoltage short-circuiting capacitor 40 for an electrical mounting board on which the device is disposed, for example. The protective housing may be made of, for example, a metal material having heat resistance, fire resistance, insulation preventing conduction to the circuit board, and a certain rigidity.

When the overvoltage is applied to the circuit, the internal pressure of the capacitor 41 rises in the overvoltage short-circuiting capacitor 40. In this case, a short circuit occurs inside the capacitor 41 due to a reduction in the insulation of the separators 16-1, 16-2 as described above. The occurrence of the short circuit causes the internal pressure of the capacitor 41 to rise. When an explosion-proof valve formed in an outer case of the capacitor 41 operates in response to the rise of the internal pressure, vapor of electrolyte is ejected from an opening part of the explosion-proof valve. In this case, the electrolyte, the electrode foil, etc. inside the outer case may scatter in the capacitor 41.

In this regard, around the capacitor 41, the protective housing 32 prevents the ejected electrolyte and internal components from scattering around the capacitor device 30.

Example 2

Figure 6:
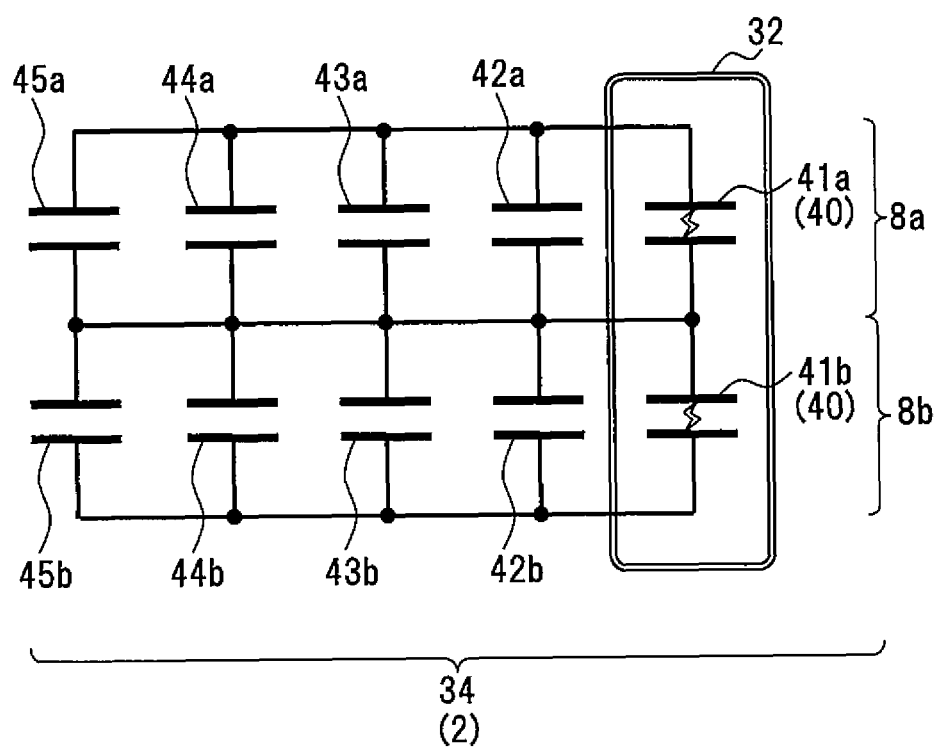
FIG. 6 is a diagram showing a second example of the capacitor device.

FIG. 6 shows a second example of the capacitor device.

A capacitor device 34 has multiple capacitors connected in a two-series/five-parallel manner. As described in the above embodiment, the capacitor device 34 includes capacitor 41a or 41b as at least one or more overvoltage short-circuiting capacitor for each of the capacitor groups 8a, 8b.

This capacitor device 34 has the protective housing 32 disposed around the capacitors 41a, 41b serving as the overvoltage short-circuiting capacitors 40. The protective housing 32 may have, for example, a single configuration for the capacitors 41a, 41b. For example, if the capacitors 41a, 41b are disposed apart from each other in the capacitor device 34, the protective housings 32 may separately be configured for each of the capacitors. For example, if the one protective housing 32 is configured for the multiple capacitors 41a, 41b, the protective housing 32 may have a partition plate formed inside the protective housing 32 so that when one capacitor is broken, the other capacitor is not affected.

Example 3

Figure 7:
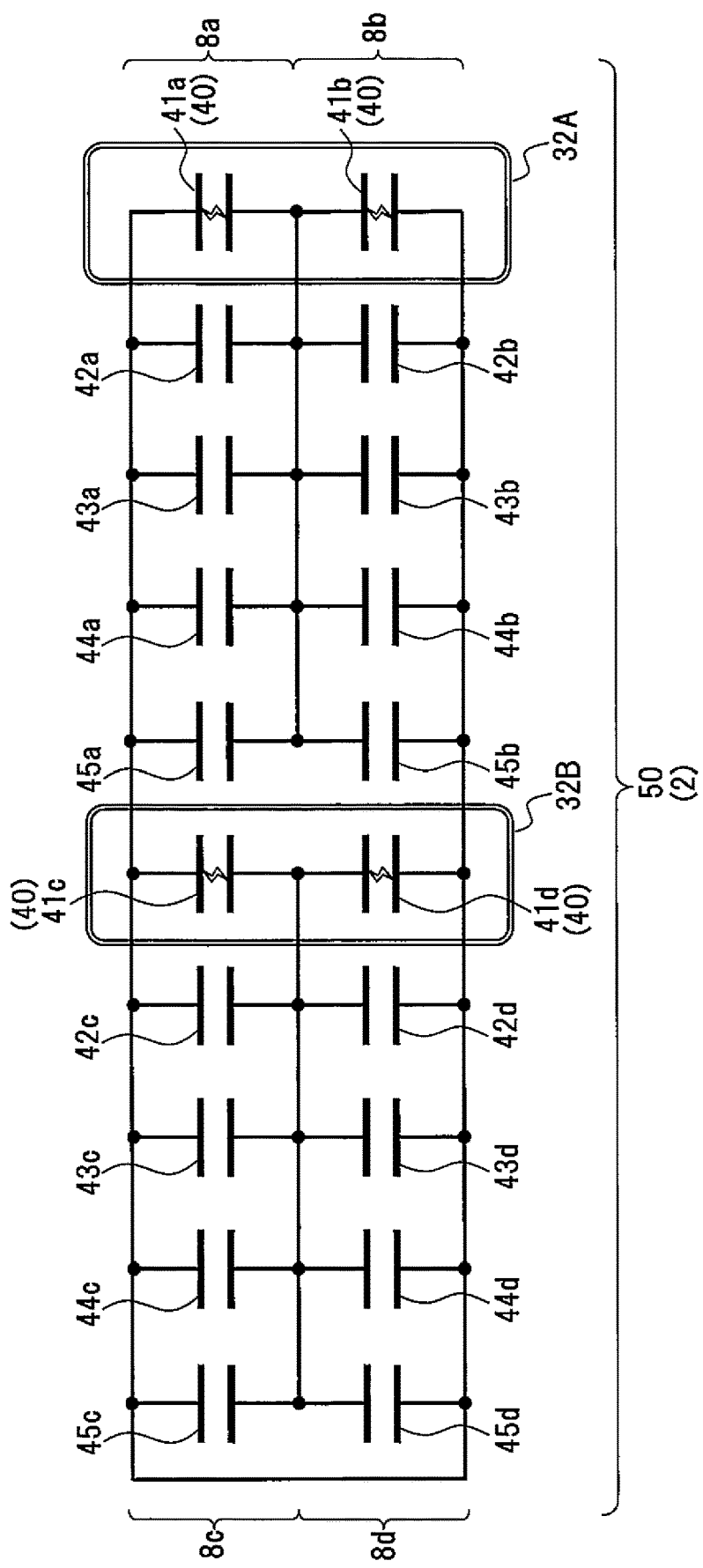
FIG. 7 is a diagram showing a third example of the capacitor device.

FIG. 7 shows a third example of the capacitor device.

In this capacitor device 50, for example, two two-series/five-parallel capacitor circuits are connected in parallel. The capacitor device 50 includes capacitor 41a, 41b, 41c or 41d as at least one or more overvoltage short-circuiting capacitor for each of capacitor groups 8a, 8b, 8c, 8d.

This capacitor device 50 has the protective housings 32 disposed around the capacitors 41a, 41b, 41c, 41d. The protective housings 32 include, for example, a protective housing 32A combining the capacitors 41a, 41b connected in series and a protective housing 32B combining the capacitors 41c, 41d. Therefore, the single protective housing 32A or 32B may be used for the multiple capacitors 41 close to each other. For example, if the capacitors 41a, 41b, 41c, 41d are disposed apart from each other in the capacitor device 50, the protective housings 32 may respectively separately be formed. For example, if the one protective housing 32 is configured for the multiple capacitors 41a, 41b, 41c, 41d, the protective housing 32 may have a partition plate formed inside the protective housing 32 so that when one capacitor is broken, the other capacitors are not affected.

Effects of Examples 1 to 3

According to the configurations, the following effects can be expected in addition to the effects of the above embodiment.

(1) The protective housing 32 is disposed in advance around the capacitor to be shorted due to an overvoltage. The capacitor device and a device connected to the capacitor device can then be prevented from being affected by scattering of components and electrolyte due to a rise in internal pressure.

(2) The capacitor to be shorted can be recognized in advance, and the need for protecting the entire capacitor device is eliminated, so that the capacitor device can be reduced in size and weight.

(3) The capacitor to be shorted due to the overvoltage is protected. The possibility of ignition can then be reduced on the side of an inverter connected to the capacitor device, and the conditions defined by the UL standard can be satisfied.

Example 4

Figure 8:
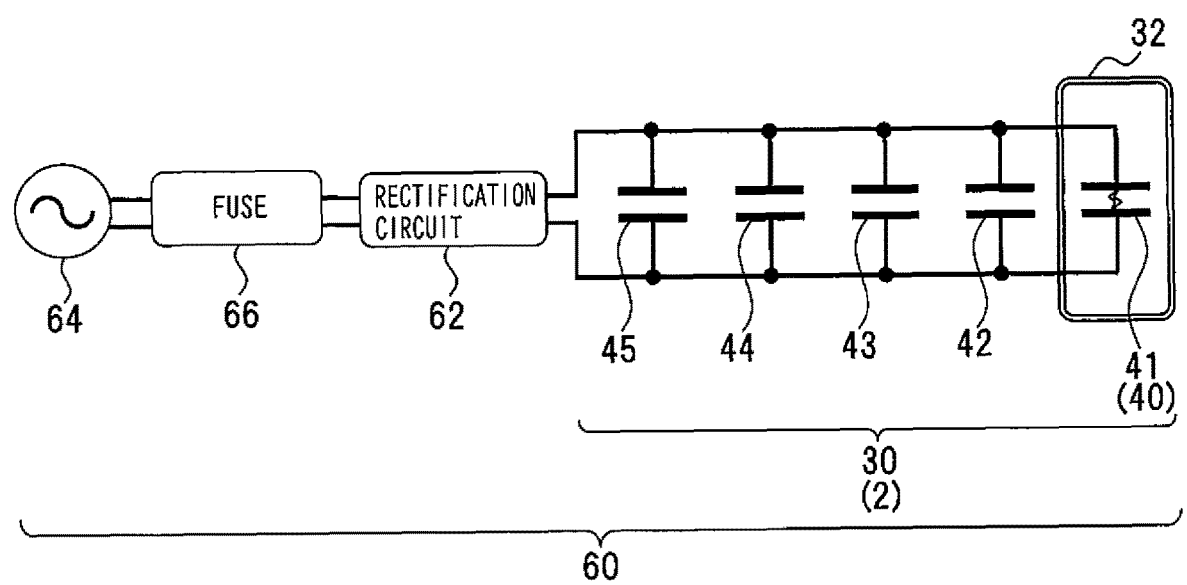
FIG. 8 is a diagram showing a fourth example of the capacitor device.

An example in the case that the capacitor device of the present invention is used for a power conversion apparatus will be described. FIG. 8 shows a fourth example of the capacitor device.

For example, as shown in FIG. 8, the capacitor device 30 is used as a smoothing capacitor bank of a power conversion apparatus 60. This capacitor device 30 has, for example, the five capacitors 41 to 45 connected in parallel, and the one capacitor 41 among them is formed such that a short circuit more easily occurs earlier than the other capacitors 42 to 45 due to the application of overvoltage as described above. In this power conversion apparatus 60, for example, the capacitor device 30 is connected between a rectification circuit 62 and an inverter not shown, and the power conversion apparatus 60 includes a fuse 66 between the rectification circuit 62 and an AC power source 64.

The fuse 66 is an example of a shutoff function part of the present disclosure and is melted down when a current larger than a set allowable current flows to the power conversion apparatus 60, thereby interrupting the circuit of the power conversion apparatus 60. For example, the fuse 66 is operated not only when an excessive electric power flows from the AC power source 64 but also when a large current flows from the capacitor 41 of capacitor device 30. Therefore, the fuse 66 is melted down when an overvoltage is applied to the capacitor device 30 and a large current flows due to the short circuit of the overvoltage short-circuiting capacitor 40.

According to this configuration, when a short circuit occurs in the capacitor device 30, a large current can be prevented from flowing to the inverter side of the power conversion apparatus 60, and the safety of the power conversion apparatus 60 can be enhanced.

Experimental Example

An experimental example in the case that capacitor devices different in the number of disposed overvoltage short-circuiting capacitors are shorted will be described.

For this experiment, for example, a capacitor device having multiple capacitors connected in series and parallel is used as a capacitor bank of a power conversion apparatus etc. This capacitor device has capacitors arranged, for example, in a two-series/two-parallel manner or a two-series/six-parallel manner, and for these capacitors, multiple conditions are set such that disposition conditions of the overvoltage short-circuiting capacitors are differentiated. A fuse and an inverter are connected to the capacitor device. A cotton as an example of a test substance is attached to, for example, a housing of the inverter. The conditions set for the capacitor device include whether or not the protective housing is disposed for the overvoltage short-circuiting capacitor.

In such a configuration, a voltage of DC 640 [V] is applied to the capacitor device. When one side of the capacitors connected in series is intentionally shorted, the voltage is entirely applied to capacitors on the side without the short circuit. As a result, in the capacitor device, the capacitor is shorted, and the fuse inserted in the input side is operated to interrupt the circuit. In this experimental example, it was checked whether the cotton disposed as the test material on the housing of the inverter ignited due to sparks generated at the time of the short circuit.

The rating of the smoothing capacitor used in this experiment includes the individual rated voltage of 400 [V], the rated capacitance of 5600 [μF], and the size of the diameter of 76.2 [mm] and the length of 130 [mm].

In the experimental results, as shown in FIG. 9, acceptable test results without ignition of the test substance were obtained from Test Examples 1 to 3 in which at least one or more overvoltage short-circuiting capacitors were disposed for the capacitors connected in parallel. In contrast, in Comparative Examples 1, 3 in which no overvoltage short-circuiting capacitor was disposed, the test substance ignited, and the test results were not acceptable. Even when the overvoltage short-circuiting capacitor was disposed, the test substance ignited in Comparative Example 2 in which no protective housing was disposed, so that the test result was not acceptable.

From these results, if the energy received at the time of occurrence of a short circuit of the capacitor is equal to or less than that causing breakage of a capacitor case, the capacitor device may be acceptable even without the protective housing. Additionally, in Comparative Examples 2 and 3 in which the number of capacitors disposed in parallel is large, a stored energy is large, and therefore, the short circuit of the capacitor has a more significant influence on the surroundings unless the protective housing is disposed.

Therefore, when the capacitor circuit includes multiple capacitors and at least one of the capacitors includes the overvoltage short-circuiting function part as in the present invention, the influence on surrounding devices can be suppressed. Additionally, by disposing the protective housing for the overvoltage short-circuiting capacitor, the safety of the device including the capacitor device can be enhanced.

[Other Embodiments]

Features and modifications of the embodiment and examples described above are listed below.

(1) In the embodiment, the embossing is described as the surface treatment of the separators 16-1, 16-2; however, the present invention is not limited thereto. Any treatment may be used as long as the insulation of the separators is partially lowered to facilitate a short circuit of the capacitor, and the separators may be subjected to a treatment such as folding and thinning. Alternatively, the separators may have other members reduced in insulation and affixed to the surface treatment parts.

(2) The easily shorted capacitor disposed in the capacitor device 30 may include a display means distinguishable from the outside. An external case of the capacitor including the overvoltage short-circuiting function part includes, for example, on a portion on the lateral side of the external case, a display means clearly indicating from the outside that it is the capacitor to be easily shorted by an overvoltage. In the formation of the capacitor device 30, for example, the capacitor including the display means is disposed at a disposition location on a circuit board not shown, for example.

With such a configuration, the capacitor including the overvoltage short-circuiting function part is easily distinguished among the multiple capacitors disposed in the capacitor device 30. Additionally, since the capacitor including the overvoltage short-circuiting function part is easily distinguished during assembly of the capacitor device 30 or a power conversion apparatus, erroneous connection to the circuit board can be prevented.

(3) In the description of an example, the fuse 66 is connected between the AC power source 64 and the rectification circuit 62 in the power conversion apparatus 60; however, the example is not limited thereto. The fuse 66 may be connected to the capacitor device 30, for example.

(4) In the description of the examples, the protective housing is disposed to suppress the influence on surrounding devices due to scattering of components and electrolyte caused by a rise of an internal pressure when the overvoltage short-circuiting capacitor is shorted by the overvoltage; however, the examples are not limited thereto. The exterior case of the overvoltage short-circuiting capacitor may be made hard so that the case is hardly broken even if the internal pressure rises.

(5) In the description of the embodiment, the separators 16-1, 16-2 are embossed to form the capacitor having the dielectric breakdown voltage made lower than that of the other capacitors; however, the embodiment is not limited thereto. The capacitor having a lower dielectric breakdown voltage may be formed by using electrode foils, separators, or electrolyte different from that of the other capacitors.

As described above, the most preferable embodiments etc. of the present invention have been described; however, the present invention is not limited to the above description and can variously be modified and altered by those skilled in the art based on the spirit of the invention described in claims or disclosed in the description, and these modifications and alterations naturally fall within the scope of the present invention.

INDUSTRIAL APPLICABILITY

The capacitor device of the present invention is useful since a capacitor device including multiple connected capacitors has at least one capacitor to be short-circuited by application of an overvoltage in a circuit so that safety measures can be taken in case of generation of the overvoltage.

EXPLANATIONS OF LETTERS OR NUMERALS

2, 30, 34, 50 capacitor device
4, 41, 41*a*, 41*b*, 41*c*, 41*d*, 42, 42*a*, 42*b*, 42*c*, 42*d*, 43, 43*a*, 43*b*, 43*c*, 43*d*, 44, 44*a*, 44*b*, 44*c*, 44*d*, 45 capacitor
6 overvoltage short-circuiting function part
8*a*, 8*b*, 8*c*, 8*d* capacitor group
10 capacitor element
12 anode foil
14 cathode foil
16-1, 16-2 separator
18 winding center
20 wound element
22-1, 22-2 surface treatment part
32 protective housing
40 overvoltage short-circuiting capacitor
60 power conversion apparatus
62 rectification circuit
64 AC power source
66 fuse

The invention claimed is:

1. A capacitor device comprising: a capacitor circuit in which a plurality of capacitors are connected to each other, wherein
one or two or more capacitors in the capacitor circuit have a dielectric breakdown voltage made lower than that of another capacitor, and wherein the one or two or more capacitors having the lower dielectric breakdown voltage are subjected to dielectric breakdown due to application of an overvoltage earlier than the other capacitor so that the capacitor circuit is short-circuited.

2. The capacitor device according to claim 1, wherein the one or two or more capacitors each comprise an overvoltage short-circuiting function part.

3. The capacitor device according to claim 1, wherein capacitor groups each including a plurality of the capacitors connected in parallel are formed in the capacitor circuit, and wherein each of the capacitor groups includes at least one of the capacitors having the lower dielectric breakdown voltage.

4. The capacitor device according to claim 1, wherein the one or two or more capacitors each comprise, in a portion of a separator interposed between electrode foils, a low insulating part having a low insulating function for the electrode foils.

5. The capacitor device according to claim 1, wherein the capacitor circuit comprises a protective housing or protective housings at least around the one or two or more capacitors.

6. The capacitor device according to claim 2, wherein capacitor groups each including a plurality of the capacitors connected in parallel are formed in the capacitor circuit, and wherein each of the capacitor groups includes at least one of the capacitors having the lower dielectric breakdown voltage.

7. The capacitor device according to claim 2, wherein the one or two or more capacitors each comprise, in a portion of a separator interposed between electrode foils, a low insulating part having a low insulating function for the electrode foils.

8. The capacitor device according to claim 3, wherein the one or two or more capacitors each comprise, in a portion of a separator interposed between electrode foils, a low insulating part having a low insulating function for the electrode foils.

9. The capacitor device according to claim 6, wherein the one or two or more capacitors each comprise, in a portion of a separator interposed between electrode foils, a low insulating part having a low insulating function for the electrode foils.

10. The capacitor device according to claim 2, wherein the capacitor circuit comprises a protective housing or protective housings at least around the one or two or more capacitors.

11. The capacitor device according to claim 3, wherein the capacitor circuit comprises a protective housing or protective housings at least around the one or two or more capacitors.

12. The capacitor device according to claim 4, wherein the capacitor circuit comprises a protective housing or protective housings at least around the one or two or more capacitors.

13. The capacitor device according to claim 6, wherein the capacitor circuit comprises a protective housing or protective housings at least around the one or two or more capacitors.

14. The capacitor device according to claim 7, wherein the capacitor circuit comprises a protective housing or protective housings at least around the one or two or more capacitors.

15. The capacitor device according to claim 8, wherein the capacitor circuit comprises a protective housing or protective housings at least around the one or two or more capacitors.

16. The capacitor device according to claim 9, wherein the capacitor circuit comprises a protective housing or protective housings at least around the one or two or more capacitors.

* * * * *